United States Patent [19]

Heyl

[11] 4,273,517
[45] Jun. 16, 1981

[54] CONTROL DEVICE FOR AN AXIAL PISTON MACHINE

[75] Inventor: Walter Heyl, Johannesberg, Fed. Rep. of Germany

[73] Assignee: Linde Aktiengesellschaft, Wiesbaden, Fed. Rep. of Germany

[21] Appl. No.: 930,031

[22] Filed: Aug. 1, 1978

[30] Foreign Application Priority Data

Aug. 3, 1977 [DE] Fed. Rep. of Germany ....... 2734933

[51] Int. Cl.³ .................. F04B 1/26; F01B 13/04
[52] U.S. Cl. .................................... 417/222; 91/506
[58] Field of Search ............... 417/222, 218, 212; 92/12.1; 91/506

[56] References Cited

U.S. PATENT DOCUMENTS

| | | | |
|---|---|---|---|
| Re. 29,333 | 8/1977 | Pensa | 417/222 |
| 3,554,671 | 1/1971 | Schlinke | 92/12.2 |
| 3,669,570 | 6/1972 | Himmmler | 417/222 |
| 3,958,496 | 5/1976 | Wallin | 417/222 |
| 4,077,744 | 3/1978 | Pensa | 417/218 |

FOREIGN PATENT DOCUMENTS

| | | | |
|---|---|---|---|
| 1044620 | 11/1958 | Fed. Rep. of Germany | 417/222 |
| 1267092 | 4/1968 | Fed. Rep. of Germany | 417/222 |
| 1498288 | 1/1969 | Fed. Rep. of Germany | 417/222 |
| 1400630 | 3/1969 | Fed. Rep. of Germany | 417/222 |
| 1425756 | 4/1969 | Fed. Rep. of Germany | 417/222 |
| 2003774 | 7/1971 | Fed. Rep. of Germany | 417/222 |
| 2312911 | 10/1973 | Fed. Rep. of Germany | 417/222 |

Primary Examiner—William L. Freeh
Attorney, Agent, or Firm—Karl F. Ross

[57] ABSTRACT

A control device for an axial piston machine in which the rocker controlling the angular orientation of the cylinder drum is shifted by a differential-action setting piston having a pin which engages in the rocker. The opposite end of this pin bears via a pressure body on one arm of a bell crank lever which can have a curved camming surface, the pressure body including a roller and being urged by a first spring against the bell crank lever. The other arm of the bell crank lever is engaged on one side by a control piston subjected to the pump pressure while the valve member which controls the pressure to the large-diameter side of the setting piston engages the opposite side of the bell crank lever and is urged against this opposite side by a second spring.

18 Claims, 2 Drawing Figures

CONTROL DEVICE FOR AN AXIAL PISTON MACHINE

FIELD OF THE INVENTION

The present invention relates to a control device for the setting of an axial piston pump, and, more particularly, to improvements in the shifting of the displaceable member of the variable-displacement pump of the axial piston type.

CROSS REFERENCE TO RELATED APPLICATIONS

This application is related to the commonly assigned copending applications Ser. Nos. 836,848 and 845,908 (now abandoned), filed Sept. 26, 1977 and Oct. 27, 1977 by Franz Forster.

BACKGROUND OF THE INVENTION

As can be seen from the aforementioned copending applications, the literature cited below and the references in the aforementioned copending applications, it is known to provide a control device for the setting (adjustment of displacement) of an axial piston pump which includes a setting piston constituted as a differential piston. The latter has a small effective surface which can be subjected to the output pressure of the pump directly and a large-diameter effective surface which can be subjected to this pump pressure under the control of a further element such as a valve member. Between the valve member and the setting piston, there can be provided a force-transmitting system which can include a bell crank lever.

The axial piston pump or pumps with which the system of the present invention can be used can be any of those described in the aforementioned copending applications or in the literature set forth below. In such an axial piston pump, the cylinder drum usually rides along a rocker or swingable slide which can be shifted to one side or another of an angular orientation in which the plane of the surface against which the cylinder drum reacts lies perpendicular to the axis of the drive shaft.

The axially displaceable pistons of this drum can react against the surface coupled with the drive shaft so that, depending upon the side to which the drum is swung from its neutral position in which its axis of rotation coincides with the axis of the drive shaft, one or the other port will serve as the outlet port and the angle to which the drum is swung from the neutral position will determine the displacement per revolution of the pump.

With conventional control device of the aforedescribed type, which are generally designed to maintain a constant output product of the pump for a given setting thereof, i.e. a constant product of the discharge pressure and displacement volume per revolution, the fulcrum of the bell crank lever is not fixed but is determined by the position of a pressure-measuring piston.

More particularly, the bell crank lever is fulcrumed on the pressure-measuring piston and is provided with a slit in which a pin for an element connected to the setting piston is slideable (see German open application—Offenlegungsschrift—DT-OS No. 1 653 385).

This construction has been found to be particularly unreliable and weak, especially when the machine is subjected to vibration, since the control mechanism is readily degenerated. The friction forces result in erroneous corrections of the position of the setting element and the lateral forces upon the pressure-measuring piston (control piston) give rise to an excessive wear so that increased leakage and power losses result. A further disadvantage of this system is that for given controller dimensions, the hyperbolic law of force transmission between the controlled and controlling elements can only be adjusted as to one parameter so that an optimum setting of the controller is not always possible.

In addition, the aforedescribed prior-art configuration of a control device is not suitable for setting or control systems in which the setting piston must be afforded a large piston stroke. This is especially the case in pumps in which the displaceable member is a swingable slide. In this case, difficulties are encountered because a spring sufficient to accommodate the desired stroke of the setting piston must be of large volume and hence occupy considerable space. It is also expensive to provide means for avoiding the buckling of the spring.

In yet another conventional system for the control of axial piston machines (see German open application—Offenlegungsschrift—DT-OS No. 2 003 774) at least approximately parallel to the setting piston there is provided a lever such that one end of the lever is articulated with the setting piston and between the other end of the lever and the setting piston, a spring is provided under prestress. The lever presses with its lateral face against the control slide. In this embodiment as well, the articulation or fulcrum of the lever has a changeable location and there is a disadvantage in the fact that the lever shifts the setting piston which applies lateral forces upon the control slide.

In German open application—Offenlegungsschrift—DT-OS No. 2 017 656, moreover, there is described a control device for the adjustment of an axial piston pump which includes a setting body and a setting piston connected with this setting body and formed as a differential piston. It is such a system that the present invention intends to improve upon as noted below. The differential piston has a small effective surface which is subjected directly to the output pressure of the pump and a large effective surface which is pressurized with the output pressure of the pump via a control element such as a valve member. A control slide is used in this system as well and a bell crank lever is provided whose fulcrum is fixed on the housing and a force-transmitting member is connected with the setting piston and has a pressure body which lies perpendicular to the axis of the setting piston and bears against one shank or arm of the bell crank lever. In this system as well disadvantages are encountered since the provision of the control piston in the setting piston is extremely expensive and the arrangement subjects the control piston and the setting piston to lateral forces which are extremely disadvantageous.

Still another arrangement using a lever system provides for the transmission of force by the lever system with variable transmission ratio. In this case, the setting piston is connected with a slide block which rests against the setting part on the one hand and against a lever on the other, whereby an end of the lever is supported by a piston subjected to the pump pressure. The second end bears against a spring-supported control slide (German printed application—Auslegeschrift—DT-AS No. 1 044 620). In this case as well, the fulcrum of the arm lever is movable.

In a kinematic reversal to the foregoing (see German open application—Offenlegungsschrift—DT-OS No. 2

003 774) the lever has one end fixedly hinged while the opposite end bears against a spring fixed in the housing. The control valve is provided in the piston rod of a piston which is shiftable approximately parallel to the lever. In this case disadvantages are also encountered which appear to result from the need to accommodate the control piston in the piston rod. A discussion of this point can be found in German Offenlegungsschrift DT-OS No. 2 017 656. See also the following German open applications—Offenlegungsschrifts—DT-OS No. 1 498 288 and No. 1 267 092.

Reference may also be had to German open applications—Offenlegungsschrifts—DT-OS No. 1 400 630 and DT-OS No. 1 425 756 which describe other control devices in which a lever system with a variable transmission ratio is employed. These systems are provided, in a manner not unlike that of the German printed application—Auslegeschrift—DT-AS No. 1 044 620, with a lever whose fulcrum is shiftable and having one end at which a spring acts. Here, however, the prestress and hence the reaction force of the spring is dependent upon the position of the setting piston and varies therewith. In this system all of the aforedescribed disadvantages of lever fulcrums which vary as to location (nonfixed lever fulcra) are encountered.

OBJECT OF THE INVENTION

It is the object of the present invention to provide a control device for an axial piston pump whereby the aforedescribed disadvantages of conventional systems can be avoided.

SUMMARY OF THE INVENTION

The present invention is an improvement on the prior-art devices set forth above which improvement is a combination of:

(a) the fulcrum axis of the bell crank lever or double arm lever is fixed in the housing (b) the setting piston is provided with a force-transmitting member which carries a pressure body and extends perpendicular to the axis of the setting piston or to a plane which is parallel to the setting piston axis, the pressure body being shiftable along this axis perpendicular to the axis of the setting piston and bearing against one shank or arm (preferably the long shank or arm) of the bell crank lever.

(c) between the setting piston and the pressure body there is provided a first spring under precompression and only this spring applies force between the setting piston and the pressure body.

(d) a control piston which is subjected to the pump pressure bears against one side of the other arm or shank of the bell crank lever while the force of the control piston and the force of the pressure body are effective in opposite directions upon the bell crank lever. The control element or valve member of the system bears upon the opposite side of the second end or arm of the bell crank lever and is under the pressure of a second spring which acts directly upon this valve member.

With such a control system, it is not only possible to obtain all of the aforedescribed objects but to provide a control system with the advantage that one and the same device can be used for the control of one or more pumps of different sizes. The system can be readily built into such pumps since a relatively small setting-piston stroke is required and only the displacement of the pressure body relative to the first arm of the bell crank lever is relevant. This relative displacement can be extremely small.

The invention thus provides a controller in which the pressure-displacement-measuring spring only need undergo a small compression stroke while the setting piston itself can have a relatively large stroke as may be required for control of a swingable-slide axial piston pump. The costs of constructing the pump are comparatively small. A controller is obtained which has been found to be most advantageous for the positioning of the swingable member of a swingable-slide axial piston pump. Thus the use of the control device according to the invention for the control of the single swingable-slide axial piston machine constitutes a significant advance attributable to the invention.

In the system of the present invention, moreover, two springs are provided. By changing the characteristic of either or both of these springs, the control characteristics of the device can be altered. The control characteristics may be considered to be the transfer function between the operation of the valve member and that of the setting piston.

It has been found to be particularly advantageous to control the characteristic of the controller by varying the force of the spring acting opposite to the force of the control piston. This spring can be readily built into the housing and similarly, the device for adjusting its force can be provided in a simple and convenient manner. However, it is also possible to control the characteristic of the controller in other ways. For instance, the surface of the bell crank lever against which the pressure body bears and upon which the pressure body rides can be made arcuate or curvilinear if desired.

So that the controller of the present invention does not oscillate or hunt, it has been found to be advantageous to incorporate damping means therein. One possibility of such a damping device is the provision of a pressure chamber between the pressure body and the setting piston. This pressure chamber can be connected by a throttle groove to a hydraulic-medium space so that oil can be expressed through this groove upon movement of the pressure body toward the setting piston.

In addition or alternatively, the space ahead of the spring-side end face of the control slider (valve member) can be used as a damping chamber and can be connected via a throttle with the interior of the housing. This throttle location can, if desired, be adjustable to allow the setting of the degree of throttling for reliable and reproducible control characteristics free from vibration and hunting. This throttle permits elimination of the vibration in the manner described while not materially increasing the response threshold of the controller.

The strokes of the various pistons, i.e. the setting piston, the control piston and the valve member, can be effected as to their displacements by abutments preferably in the form of set screws threaded into the housing or into members which, in turn, are screwed into the housing.

The control piston and valve member on the one hand and the setting piston on the other hand can lie in a common plane one beneath the other. They can, however, lie side by side in the direction of the machine shaft although it has been found to be advantageous to provide the device such that the axis of the control piston, the axis of the valve member and the bell crank lever lie in a plane which is parallel to the axis of the setting piston. This plane may be offset from the axis of the setting piston. In the latter case, the displacement direction of the pressure body will be in a plane substantially perpendicular to the axis of the setting piston and tangential to this axis. This has the effect that the force developed by the pressure body is transformed into a torque upon the setting body and this torque can be readily supported. While the provision of additional support for this purpose may be disadvantageous, the latter arrangement has the advantage that the system can be accommodated in much smaller space. The same advantage is obtained when, as in the first case, the axes of the setting piston, control piston and valve member lie in a plane which is substantially perpendicular to the plane in which the shaft of the pump and the cylinder drum axis lie.

The control piston and valve member can be coaxial with one another. They can, however, also lie in the plane of the bell crank lever with an offset of their respective axes in this plane such that a lever transmission is provided between the control piston and the valve member.

A significant advantage of the system of the present invention is that it is readily usable for the control of multiple pumps. In this case, two or more control pistons can be provided parallel to each other and can be pressurized by the respective pumps, both control pistons bearing upon the same arm of the bell crank lever. The control piston can also be constituted, if desired, as a stepped piston, each step being pressurized by the output from one of the pumps. The setting piston is then connected with the various pumps, especially when the latter are formed as swingable-slide pumps, by suitable means, e.g. a common swingable slide for all of the cylinder drums of the multiple pumps.

In many applications, especially when the pump is to be continuously connected to an internal combustion engine for long periods of time, or is permanently connected to an internal combustion engine, it is desired that the start-up of the pump utilize a minimum torque so that the driving prime mover can be started in an unloaded state. In this case, naturally, it is desirable to decouple the load of the pump from the internal combustion engine. In this case, it is advantageous when the pump is set to stand-still that it be shifted into its smallest displacement (stroke volume) per unit rotation, i.e. into its neutral position.

This can be achieved, in accordance with the invention, by providing the spring bearing on the pressing body and the spring acting upon the control valve such that they are relieved in the stand-still condition of the pump. Such force relief can be effected automatically under the control of a centrifugal-force governor (in response to engine or pump speed). The relieving of the spring force insures, upon start-up or shut-down of the prime mover, a setting of the pump into a position corresponding to minimum stroke volume per unit rotation. The relieving of the springs can thus be dependent upon the speed, as indicated, via the centrifugal force governor or can be effected by connecting an auxiliary pump to the engine which forces its output through a throttle. The prestress of the spring can thus be generated by tapping the static pressure ahead of the throttle. When a predetermined speed is reached, the spring is again prestressed so that the controller is given its set point value in the manner described previously. This threshold speed can be, for example, the lower or upper idling speed of the engine. Instead of an auxiliary pump, the flow from the main pump can be used as long as care is taken that the main pump output is not throttled for long periods or permanently.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
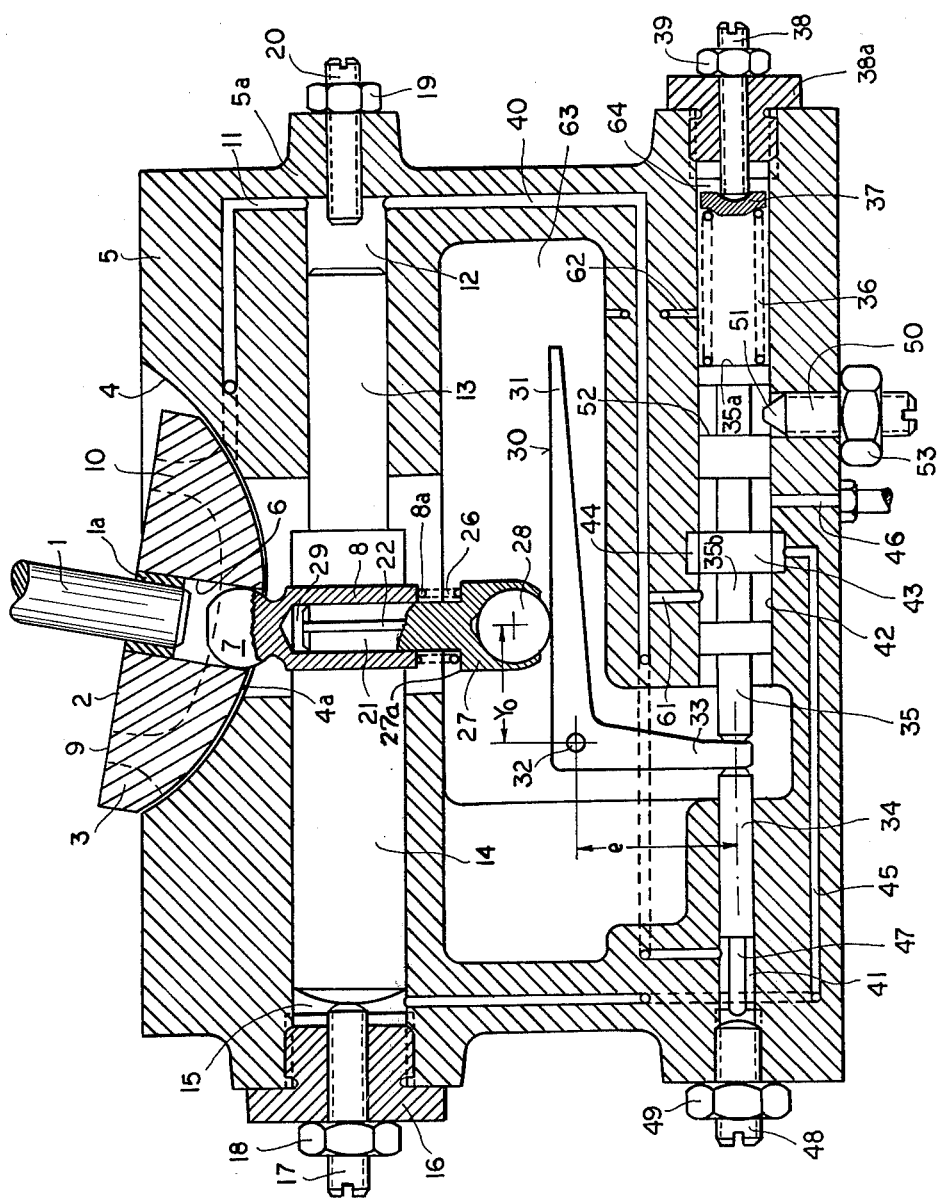
FIG. 1 is an axial cross-sectional view through a portion of an axial piston machine according to the invention showing the rocker.

As can be seen from FIG. 1, the cylinder drum of an axial-piston pump, which has not been illustrated, can be rotatable on the central shaft 1 which is mounted centrally in the displacement-controlling member or rocker 3. The latter has a planar face 2 constituting the control face of the rocker and resting against the bottom of the cylinder drum which, in the usual manner, is provided with axially reciprocating pistons arranged in a circular pattern in angularly equispaced cylinder bores which successively communicate with the control kidney-shaped openings 9 in the surface 2.

As the cylinder drum is driven, therefore, the pistons alternately induce the flow of the fluid into the cylinder bores and express fluid from the cylinder bores, thereby displacing the fluid.

The opposite side of the rocker 3 is formed with a cylindrical convex surface 4a which rides along a hollow-cylindrical or concave surface 4 of the housing bottom 5. From this housing bottom, a shell can extend to enclose the cylinder drum and provide, at the opposite end thereof, a bearing in which the shaft driving the cylinder drum and also not illustrated in FIG. 1, is rotatable.

The rocker 3 is formed with a guide bore 6 which extends coaxially to the shaft 1 and hence along the axis of the cylinder drum and the rocker.

The shaft 1 is anchored by a sleeve 1a in this guide bore and the guide bore, at its other end, receives a ball-shaped or spheroidal extremity 7 of a positioning pin 8.

The kidney-shaped openings 9 in the surface 2 are in communication with passages 10 which communicate with a passage 11 formed in the housing bottom 5.

The passage 11 communicates with a cylinder chamber 12 in which the small-diameter portion 13 of a setting piston 13,14 is displaceable. Generally, the piston 13,14 is shiftable in a plane common to the axis of pin 8 and of shaft 1 but perpendicular to the axis of pin 8 and generally transverse to the axis of shaft 1.

The large-diameter portion 14 of this piston is slidable in a cylinder 15 closed at its left-hand end by a plug or cover 16.

A setting screw 17 is threaded into the plug 16 and is formed with a rounded inner end adapted to form a stop for the rounded left-hand end of the piston 14. The screw 17 can be locked in place by a counternut 18. Thus the screw 17 forms an abutment for the displacement of the piston 13,14 in its direction to the left.

In a corresponding way, a setting screw 20 is threaded into a boss 5a of the housing 5 and is locked in place by a counternut 19. The inner end of the screw 20 is adapted to engage the right-hand end of the piston portion 13. Displacement to the right of the piston 13,14 is thus limited by the abutment formed by the screw 20.

The positioning pin 8 is formed with a bore 29 in which a slidable portion 21 of a pressure body 27 is axially shiftable and received. This body is provided at its lower end with a rotating ball 28 riding along the surface 30 of the bell crank lever 31.

The guide portion 21 of the pressure body is formed with a groove 22 along its periphery which acts as a damping throttle for the fluid expressed from the bore 29 when the portion 21 shifts into the latter. Between the pin 8 and the shoulder 27a of the pressure body 27, a spring 26 is received under precompression. More particularly, the spring 26 is seated against the shoulder 27a and the end 8a of the pin 8.

The bellcrank lever 31 is fulcrumed with minimum friction upon a journal pin 32 on the housing 5. To further reduce the resistance to rotation of the bellcrank lever, the latter can be mounted on the pin 32 via a sleeve bearing or a ball bearing. The sleeve bearing should be a low friction wear-resistant self-lubricated bearing.

The control piston 34, which is axially shiftable parallel to the axis of the piston 13,14, bears against one side of the short arm 33 of the bellcrank lever. On the opposite side of this short arm 33 of the bellcrank lever, the pilot valve 35 (spool valve) acts via the force of a second spring 36. The spring 36 rests against the right-hand face 35a of the spool valve 35 and is seated on a disk 37 which, in turn, rests against a setting screw 38 threaded into a plug 38a closing the bore 64 and provided with an external thread fitted into the internal thread at the right-hand end of the bore 64. A counternut 39 clamps the setscrew 38 against rotation in its adjusted position. The setscrew 38 thus adjusts the force with which the spring 36 acts upon the spool valve 35.

The cylinder 12 is, as noted, in communication with the passage 11. The passage 11 is also connected to the bore 40 running to the cylinder 41 in which the control piston 34 is shiftable. From the passage 40, a branch 61 communicates with the bore 42 which is constituted as an extension of the bore 64. The bore 42 slidably receives the spool valve 35.

The branch passage 61 opens into the bore 42 in a region which continuously communicates with an annular groove 35b in the spool-valve member 35, this region lying to the left of the land or shoulder 43. In the position shown in FIG. 1, the latter land has an axial width corresponding precisely to that of an annular groove 44 formed in the wall of the bore 42.

The annular groove or chamber 44 communicates with a passage 45 which extends to the cylinder 15 and opens on the left-hand side of the end of piston 14.

An outlet or discharge bore 46 communicates with the cylinder bore 42 to the right-hand side of the annular space 44.

The control piston 34 is provided with a projection or extension 47 which can come to rest against a setting screw 48 threaded into the housing 5 and tightened therein with a counter nut 49.

The setting screw 48 thus limits the displacement of the control piston 34 as will be described below.

The setting screw 48 is turned so that it engages the projection 47 and displaces the control piston 34 until the land 43 of the spool valve member 35 exactly coincides with the annular groove 44 and closes the latter. The screw 48 is then backed off slightly to provide a mobility to the left of the control piston 34, i.e. to clear the left-hand end of the projection 47.

A set screw 50 is provided with a conical end 51 and is threaded into the housing 5. By advancing or retracting the screw 50, the stroke of the spool valve member 35 can be adjusted, i.e. the position of the edge 52 of the spool valve member can be limited.

The screws 50 and 48 thus adjust the maximum possible free displacement defined by the edges of the spool valve member and the edges of the annular groove 44, thereby establishing the maximum adjusting speed of the unit.

By advance of the screw 50 to have more of the conical end 51 project into the bore 42, the stroke of the spool valve member 35 can be limited to a greater extent. The set screw 50 also allows, upon dismounting of the control device, the spool valve member 35 from being pressed by the second spring 36 out of the bore 42. The set screw 50 can also be locked by the counter nut 53.

The system illustrated in FIG. 1 and described above operates as follows:

The drum of the axial piston pump with its axially reciprocating pistons, angularly equispaced piston bores and journaling arrangement upon the shaft 1 has not been illustrated and is conventional in the art as will be apparent from the aforedescribed copending applications.

Before the control unit of FIG. 1 comes into play, the pressure side of the pump is connected via passage 11 to the cylinder 12 so that the output pressure of the pump is applied to the free end of the setting piston 13,14 and tends to displace this piston to the left in FIG. 1. The maximum left-hand position of the piston 13,14 corresponds to the greatest output of the pump, i.e. the greatest displacement per unit rotation thereof.

If the pressure exceeds a predetermined threshold value, the pressure in cylinder 41 displaces the control piston 34 to the right as seen in the drawing and urges the bell crank lever 31 in the counter-clockwise sense about its fulcrum 32 so that the pressure body 27 is forced against the action of spring 26 further into the member 8.

Simultaneously, the control slide or pilot-valve member 35 is urged against the force of the second spring 36, i.e. to the right, so that the land 43 of the pilot valve 35 opens communication between the branch passage 61 and the passage 45. The hydraulic fluid is thus admitted to the cylinder 15 with a slight throttling resulting from the interaction of the edges 43,44.

Since the end face of the setting piston member 14 is of a larger area than the end face of the setting piston portion 13, the piston 13,14 is displaced, in the manner of a differential piston, to the right as shown in FIG. 1 and thus reduces the displacement per revolution of the pump by swinging the rocker 3.

As a result, the effective lever arm $Y_o$ is increased, this effective lever arm being the resistance arm of the bell crank lever determined by the distance from the point at the tack of the ball 28 of the pressure body 27 upon the arm 31 on its surface 30 and the fulcrum 32 of the bell crank lever.

The otherlever arm e measured between the point of attack of member 34 and the fulcrum 32 remains unaltered.

The position of the setting piston 13,14 thus affects the length of the lever arm $Y_o$ and hence the moment which is attributed to this lever arm, i.e. the product of the distance $Y_o$ and the force of the first spring 26.

When the output pressure of the pump decreases, the pressure in passage 11 likewise is reduced and the control piston 34 returns under the combined effects of the springs 26 and 36 in the opposite direction with the result that the pilot valve member 35 establishes communication between the passage 45 and the outlet passage 46. This, in turn, reduces the pressure in cylinder 15 and has as a consequence the displacement of the setting piston 13,14 in the left-hand direction as viewed in FIG. 1.

The bore 62 connects the space ahead of the spring-side end face of the pilot valve member 35 with the housing interior 63. This bore 62 is provided with an adjustable throttle which has not been shown in the drawing and can be formed by a needle valve. This allows an adjustable damping of the device.

In the embodiment of FIG. 1, the surface 30 of the bell crank lever 31,33 upon which rides the pressure body 27 and its ball 28 is rectilinear. In another embodiment of the invention, however, this surface can be arcuate. This change in shape of the surface can allow adjustment of the response characteristic of the control system as desired. For instance, when small outputs are desired concurrently with a large range of adjustment of the angular displacement of the rocker and hence the pump, the curved configuration of the ramp or cam surface formed at 30 can provide the necessary characteristic.

Naturally, one and the same bell crank lever 31,33 can be provided with various camming surfaces of different curvature as required. The camming surfaces may simply be set upon the surface 30 shown in FIG. 1, e.g. by forming the curved surface on a bar which is attached to the long arm 31 of this lever. In this case, the ball 28 of the pressure body 27 can ride along the replaceable or interchangeable cam surfaces which can be mounted upon and dismounted from the long lever arm 31.

In addition or alternatively, the position of the camming surface relative to the bell crank can be altered selectively by providing a set screw which can be disposed substantially tangential to the axis of the fulcrum 32 and which can bear upon the cam-carrying member so as to displace the latter relative to the arm 31 of the bell crank lever. The screw can thus act on one end of the bar carrying the camming surface while the other end thereof can be hinged or otherwise articulated to the bell crank lever. In this case, the inclination of the camming surface relative to the bell crank lever can be readily adjusted.

It has been found to be especially advantageous in this system when the set screw is accessible through an opening in the housing 5 to allow adjustment.

Omission of the bell crank lever 31,33 results in a O-stroke controller or pressure controller.

Figure 2:
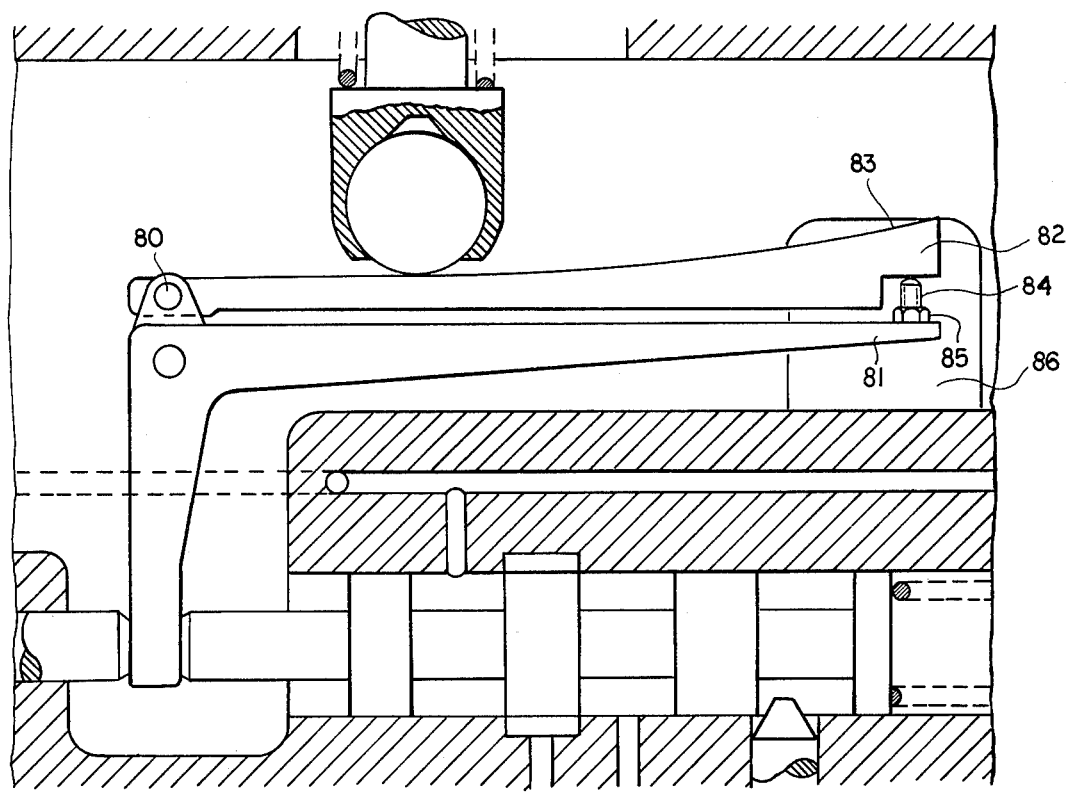
FIG. 2 is a cross-sectional view drawn to a larger scale than FIG. 1 but illustrating a modification thereof.

The embodiment of FIG. 2 differs from that of FIG. 1 in that in the region of the fulcrum 32 of the lever 31, there is provided a hinge 80 by which a further lever 82 is pivotally connected to the long arm 81 of the bell crank lever. The additional lever 82 is provided with a hyperbolically shaped curved surface 83 forming the camming surface mentioned previously and against which the pressure body 28,27 rides. A set screw 84 connected to the free end of the bell crank lever 81 acts upon the lever 82 to adjust the inclination thereof relative to the bell crank lever. A counter nut 85 can lock the set screw 84 in place and, advantageously, the set screw 84 and the nut 85 are accessible through an opening 86 in the housing which can be closed by any conventional plate.

I claim:

1. In a control device for the adjustment of the displacement per revolution of an axial piston pump having a housing, a displacement-controlling member angularly displaceable in said housing and acting upon a cylinder drum of the pump, a setting piston constituted as a differential piston and having large-diameter and small-diameter portions connected to said member for displacing same, a small surface of the differential piston being subjected to pump pressure and a large surface of the differential piston being subjected to pump pressure as controlled by a valve member forming a control element, a bell crank lever fulcrumed in said housing and engaged by a pressure body connected to said setting piston for effecting force transmission between said valve member and said setting piston, the improvement which comprises in combination:
   (a) a first spring interposed between said setting piston and said pressure body, said spring urging said pressure body toward said bell crank lever;
   (b) a control piston bearing upon one side of a first end of said bell crank lever and urged by the aforementioned pump pressure thereagainst; and
   (c) a second spring bearing upon said valve member and urging same against the opposite side of said first end of said bell crank lever, the pressure on said control piston and the force of said first spring acting in opposite directions on said bell crank lever and said second spring bearing directly upon said valve member.

2. The improvement defined in claim 1 wherein between the pressure body and said setting piston, there is provided a damping chamber for damping the displacement of said pressure body relative to said setting piston.

3. The improvement defined in claim 1 wherein said valve member cooperates with a damping chamber having a discharge passage formed with a throttle.

4. The improvement defined in claim 1 further comprising a wedge-shaped control member adjustably displaceable into the path of said valve member for controlling the displacement thereof by abutment with edges of the valve member.

5. The improvement defined in claim 1 further comprising an adjustable abutment screw limiting the stroke of said control piston.

6. The improvement defined in claim 1 in which the control system is used for a plurality of pumps and in which two mutually parallel control pistons act upon said bell crank lever.

7. The improvement defined in claim 1 for the control of a plurality of pumps wherein the control piston is formed as a stepped piston, each step of said piston being subjected to the output pressure of one of said pumps.

8. The improvement defined in claim 1 wherein the axis of said setting piston, the axis of said control piston and the axis of said valve member lie in a common plane, the fulcrum of said bell crank lever having an axis lying perpendicular to said plane.

9. The improvement defined in claim 8 wherein the axis of said drum is substantially coplanar with said axes of said control piston, said setting piston, and said valve member.

10. The improvement defined in claim 9 wherein the axes of said control piston and said valve member are coaxial.

11. The improvement defined in claim 1 wherein said bell crank lever has a surface engaged by said pressure body which is of arcuate shape.

12. The improvement defined in claim 11 further comprising means for adjusting the position of the surface engaged by said pressure body relative to the remainder of said bell crank lever.

13. The improvement defined in claim 12 wherein said surface engaged by said pressure body is formed on a bar articulated at one end to said bell crank lever in the region of the fulcrum thereof, said bell crank lever being provided with a set screw bearing on said bar at a free end of the bell crank lever remote from said fulcrum.

14. The improvement defined in claim 1 further comprising a controlable force-relieving device for at least one of said springs.

15. The improvement defined in claim 14 wherein said force-relieving device comprises a piston against which said one of said springs bears and which is subjected to fluid pressure ahead of a throttle urging the piston of said force-relieving device against an abutment.

16. The improvement defined in claim 15 in which the force-relieving device is a centrifugal speed controller.

17. The improvement defined in claim 1 in which the pump is of the swingable-slide construction and the setting piston is provided with a setting pin extending generally perpendicular to its axis and engaging the swingable slide.

18. The improvement defined in claim 17 wherein said setting pin forms a guide on its side opposite the swingable slide for the pressure body.

* * * * *